W. E. PALMER.

TYPE WRITING MACHINE.

APPLICATION FILED JUNE 17, 1912.

Reissued Oct. 15. 1912.

13,478.

2 SHEETS—SHEET 1.

WITNESSES:

E. M. Wells

Charles E. Smith

INVENTOR:

Walter E. Palmer

By Jacob Felbel

HIS ATTORNEY

W. E. PALMER.

TYPE WRITING MACHINE.

APPLICATION FILED JUNE 17, 1912.

Reissued Oct. 15, 1912.

13,478.

2 SHEETS—SHEET 2.

WITNESSES:

E. M. Wells

Charles E. Smith

INVENTOR.

Walter E. Palmer

By James Field

HIS ATTORNEY

UNITED STATES PATENT OFFICE.

WALTER E. PALMER, OF CICERO, ILLINOIS, ASSIGNOR TO UNION TYPEWRITER COMPANY, OF JERSEY CITY, NEW JERSEY, A CORPORATION OF NEW JERSEY.

TYPE-WRITING MACHINE.

13,478. Specification of Reissued Letters Patent. Reissued Oct. 15, 1912.

Original No. 1,008,063, dated November 7, 1911, Serial No. 598,802. Application for reissue filed June 17, 1912. Serial No. 704,245.

*To all whom it may concern:*

Be it known that I, WALTER E. PALMER, a citizen of the United States, and a resident of Cicero, in the county of Cook and State of Illinois, have invented certain new and useful Improvements in Type-Writing Machines; and I do hereby declare that the following is a full, clear, and exact description thereof, reference being had to the accompanying drawings, and to the characters of reference marked thereon, which form a part of this specification.

This invention relates to improvements in tabulator mechanism for typewriting machines and refers more particularly to novel means for controlling and positioning the column stops of such mechanism by which the carriage is arrested at predetermined columnar positions in its travel for printing a series of items in vertical columns. Tabulator mechanisms of this character usually embrace, in combination with the carriage and the machine frame, a series of stops supported on one of the parts and longitudinally adjustable with respect to the path of the carriage travel, and a cooperating device or devices carried by the other part and adapted by manipulation of a key or like device, to be shifted into cooperative relation with said column stops, the said key usually operating at the same time to release the carriage from the control of its letter spacing mechanism so as to permit the carriage to move under the influence of its actuating spring to a point or points determined by the adjustment of the column stop or stops.

I have herein shown my invention as applied to the Oliver typewriter of the general construction illustrated in the prior patent to Knapp and Harting, No. 916,720, dated March 30th, 1909, but it will be understood that the essential features of the invention may be applied to other types of typewriting machines, and the invention is not, therefore, limited to the specific adaptation herein disclosed, except as to such claims wherein the particular structure is specifically set forth.

Figure 1:
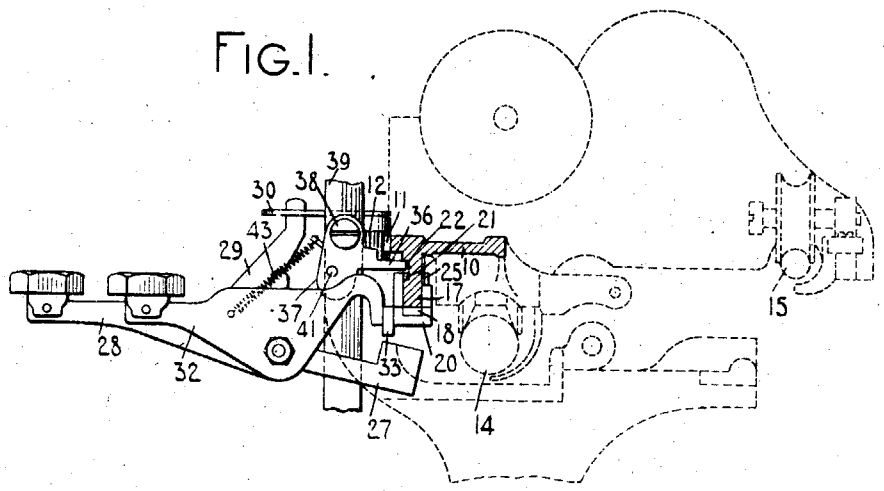
Figure 3:
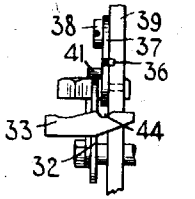
Figure 2:
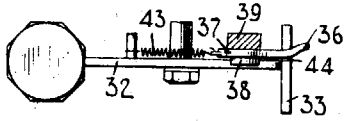
Figure 4:
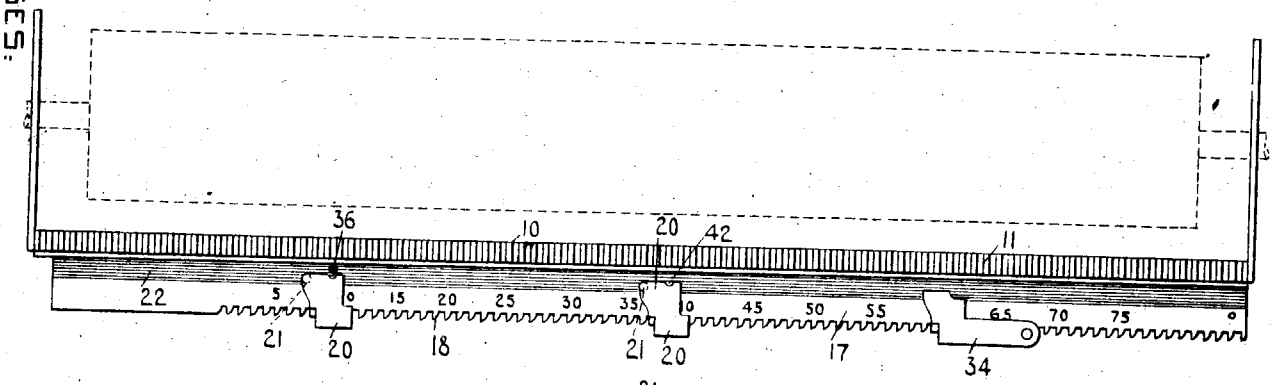
Figure 5:
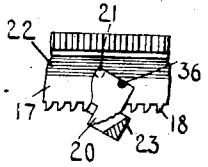
Figure 7:
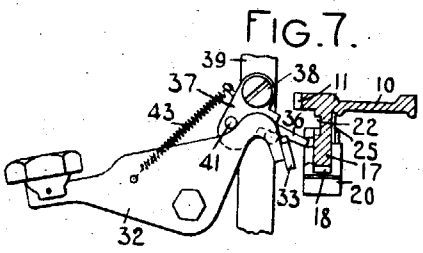
Figure 6:
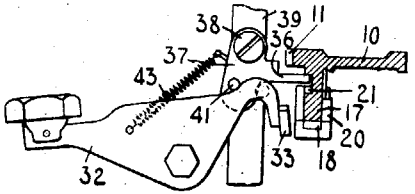

In the drawings, Figure 1 is a side elevation with parts in section, the view showing the carriage and some of the associated parts. Fig. 2 is a fragmentary plan view of the column stop controlling means included in my invention. Fig. 3 is a fragmentary rear elevation of the parts shown in Fig. 2. Fig. 4 is a front view including a portion of the paper carriage showing the adjustable column stops thereon and a portion of the stop-controlling means. Fig. 5 is a fragmentary front view illustrating one of the column stops and the means by which the stop is supported and locked in place, the stop in this view being shown in the released position. Fig. 6 is a detail fragmentary side elevation with parts in section of a portion of the construction shown in Fig. 1, but showing the relations of the parts when the key is slightly depressed. Fig. 7 is a like view of the same but showing the parts as they appear when the controlling key is fully depressed.

As shown in said drawings, 10 designates the longitudinal frame member of the carriage, on the forward margin of which is formed the rack 11 which engages with the pinion 12 of the letter spacing mechanism. The carriage is supported and travels on the rails 14 and 15 of the carriage shifting frame which, for the purposes of the present invention, may be regarded as a part of the frame of the machine, or a frame on which the carriage is mounted for traveling movement. The said frame member 10 is provided with a depending flange or bar 17 located just in rear of a vertical transverse plane extending through the rack 11. The bar 17 is provided at its lower margin with a plurality of ratchet teeth 18, adjacent teeth being arranged a letter space distance apart. This bar 17 is provided also on its front face with a scale marked to correspond with the letter space scale of the carriage, and with the spacing of the ratchet teeth 18. Mounted on said bar 17 are a plurality of adjustable tabulator or column stops 20 of the form shown best in Figs. 5, 6 and 7; each stop comprising parallel front and rear members connected by the lower transverse member, and arranged to embrace the lower toothed margin of the bar 17. The front member of each stop is provided at its upper end with a rearwardly projecting stud or pivot 21 received in a longitudinal groove 22 formed in and extending longitudinally of the bar 17 to enable a relative sliding movement and adjustment between said bar and stops longitudinally of the bar to be effected. The transverse members of said stops are provided with holding teeth 23 adapted to engage the ratchet teeth 18 of the bar 17 to lock said stops in adjusted positions on the flange. The said stops are normally held so that the teeth 23 engage with the teeth 18 of the bar 17, by means of the springs 25 attached to the stops and bearing against the flange in the manner shown in the aforesaid patent to Knapp and Harting, No. 916,720. When a stop is swung downwardly about its pivot or stud 21, against the power of the spring 25 of said stop, to the position shown in Figs. 5 and 7, the stop is freed from locking engagement with the bar and a relative sliding movement between the ratchet bar 17 and the stop thus released may be effected, and the stop located at any desired position along the bar. When the stop is unrestrained its spring 25 returns the stop to normal position with the tooth 23 thereof engaged with the ratchet teeth 18 of the bar 17, thereby locking the stop in its adjusted position. Said stops cooperate with a key actuated stop member 27 pivotally mounted on the shift frame, said stop member being movable vertically into and out of the path of the stops 20. The stop member 27 is shown as formed on the rear end of the key actuated lever 28 which is pivotally mounted on a suitable bracket carried by the carriage shift frame and situated at about midway between the sides of the machine. The lever 28 is provided with an upwardly and rearwardly extending arm 29 which is connected by a horizontally arranged link 30 with the upper end of the shaft that carries the pinion 12 of the letter spacing mechanism. The arrangement of the parts is such that when the lever 28 is swung to move the stop member 27 into the path of the stops 20, said pinion will be released from the rack 11 of the letter spacing mechanism so that the carriage will be free to move under the influence of its actuating spring to a position determined by the adjustment of the next adjacent stop 20. These features of the tabulating mechanism described above are, or may be, like that of the construction of the Knapp and Harting patent before referred to and constitute, in themselves, no part of the present invention. Heretofore in some tabulating mechanisms of this general type it has been customary when it is desired to adjust the column stops on their supporting member, to effect such adjustment by direct manual engagement, either when the carriage is in place on the machine frame or when the carriage has been removed from the machine frame to give freer access to the stops. Where a great variety of work is done, as, for example, in large offices requiring tabulating in columns of different widths, such adjustment of the stops to change the spacing of the columns is tedious and consumes considerable time. In other forms of tabulating mechanism a separate column stop is provided for each letter space position of the carriage and means are employed to set such column stops in the operative or inoperative positions. Such structures are open to the objections that they require in some instances as many as three hundred and sixty column stops which are carried by the carriage and add materially to the weight thereof, in addition to adding to the cost of production.

One of the main objects of my invention is to overcome some of the difficulties pointed out above and to provide a simple and efficient construction in which the number of column stops employed need not be in excess of the number to be used at any one time and in which means are provided to control the relative adjustment of such column stops.

A further object of my invention is to provide simple and efficient key controlled means operable individually on the column stops to control the movement of such stops into or out of engagement with the locking means by which the stops are locked to the part of the machine, such as the carriage for example, which carries them.

A still further object of the present invention is to provide means which may be operated by a single actuating key or like device to control the setting or adjustment of a plurality of column stops to vary the spacing of the tabulated work without removing the carriage or grasping the stops directly by hand and adjusting them to the desired position.

In the present Oliver construction it is convenient to associate the column stop setting, adjusting, controlling, or positioning device with, or mount the same on the usual right-hand margin release key lever 32. This key is arranged midway or about midway between the sides of the machine and just to the right of the key lever 28. The key lever 32 is ordinarily employed to release the margin stop member 33, carried by the rear end of said key lever, from or move it out of the path of the right-hand margin stop 34 which is also adjustably mounted on the ratchet bar 17, as shown in Fig. 4. While this arrangement of the column stop controlling, setting or adjusting device is desirable in that it enables me to readily apply it to a machine of the kind shown without material change in the construction thereof, yet it is to be understood that the invention is not limited to this arrangement, but that said column stop controlling device may be provided with a separate actuating key and may be constructed and arranged in a manner other than that indicated. The said column stop controlling or adjusting device comprises, in general terms, a rearwardly directed finger 36 which is made rigid with and extends rearwardly from a swinging member 37 that is pivoted at its upper end by a pivot pin 38 to a relatively fixed part 39 of the carriage shift frame. This frame for the purposes of the present invention may be regarded as a part of the frame of the machine or a carriage supporting frame. The said finger 36 extends rearwardly beneath the rack 11 of the letter spacing mechanism and into the upper part of the groove 22, which receives the pivots 21 of the stops 20. The groove 22 is shown as somewhat enlarged, and this may be accomplished by cutting away the metal of the bar 17 to adapt it to receive the finger 36 and to permit the carriage to be moved freely without bringing the column stops or the carriage into contact with the finger 36. The said swinging member 37 is provided at one side with a laterally extending pin 41 which normally lies a distance above the upper margin of the key lever 32, and is adapted, when the rear end of the key lever is swung upwardly, to be engaged by the latter (as shown in Fig. 6). In the continued swinging movement of the key lever the contact of the lever with said pin 41 serves to swing the member 37 forwardly, and thereby swing the rear end of the finger 36 downwardly. Each column stop is provided at its upper end, and near the margin thereof and remote from the pivot 21, with an upwardly opening notch 42.

The relation of the key controlled tabulator stop member 27 with the rear end of the finger 36 is such that when the carriage is arrested by engagement of one of the column stops 20 with said stop member 27, the rear end of the said finger 36 will be located directly over the notch 42 of the adjacent stop, as indicated at the left-hand end of Fig. 4. Therefore, when the carriage is thus arrested by engagement of one of the column stops 20 with the tabulator stop member 27, and it is found necessary or desirable to reset or adjust the column stop to bring it to the proper position relatively to the paper receiving the printed impressions, the key lever 32 is depressed, as shown in Figs. 5 and 7. In this movement the lever engages the pin 41, and swings the member 37 forwardly and thereby swings the rear end of the finger 36 downwardly into the notch 42 of the adjacent column stop and swings the stop on its pivot to the released position or out of engagement with its locking means 18, as indicated in Fig. 5. The column stop is thus engaged by the finger 36 seated in the slot or notch 42 to effect an interlocking engagement between the stop and finger, while the column stop is maintained in the released position, and the finger is effective to hold, restrain, confine or retain the column stop or maintain it temporarily fixed while the carriage and stop bar 17 may be moved independently thereof in the direction of the travel of the carriage either to the right or left. The travel or endwise movement of the carriage may be brought about either by hand, or by the usual forward or back-spacing mechanism, to thereby change the relative position of the stop on its carrying member or bar 17, so as to effect a relative adjustment of said stop adapting it to arrest the carriage at a new point or column determining position. After a relative adjustment of the column stop has been attained, the operator releases pressure on the key and a returning spring 43, connected at one end to the lever 32 and at its opposite end to the member 37, returns the parts 32 and 37 to normal positions and the column stop is caused to engage the teeth 18 by its spring 25. It will be readily seen that either of the column stops 20 may thus be adjusted or reset in a like manner, and that such resetting operation is effected by a single manually operable device, as the key lever 32.

When the setting or adjusting device is mounted on or associated with the right-hand marginal release key, and is therefore located over the margin stop member 33 of said key, the said stop member may be provided with the upwardly opening notch 44 to receive the finger 36 when the latter is swung downwardly into engagement with the notched stop 20 and thus stiffen said finger against lateral deflection, as will be evident. In other adaptations of the setting finger it may be otherwise stiffened.

As hereinbefore explained, the key controlled tabulator stop 27 is arranged midway or about midway between the sides of the machine with its contact face in, or approximately in a fore and aft vertical plane extending through the printing point. If, therefore, a column stop be engaged with this tabulator stop 27 and the column stop be then released and held against movement by the controlling device 36—37 while the carriage is adjusted relatively thereto, and a reëngagement of the stop with its locking means 18 be effected when the carriage has reached the proper position where the carriage is to be arrested by said stop, this will result in a proper positioning of the column stop. For example, if a column stop is to be set to arrest the carriage at "30" on the carriage scale, then the released stop will be held by the device 36—37 until the carriage reaches a position which is indicated by "30" on the carriage scale and then the column stop will be released and allowed to engage the rack 18. During the subsequent operation of the tabulating mechanism, the coöperation of the tabulator stop 27 with this column stop will effect an arrest of the carriage at "30" on the carriage scale.

If desired, the column stops may be positioned at the proper points while a sheet is in the machine and by direct reference to the sheet and the usual printing point indicator. For example, if the sheet should be ruled to divide the different columns the operator may hold one column stop while the carriage is moved to bring the first line on the sheet just to the left of the printing point indicator. The column stop may then be released and locked on the stop bar and so on until the different stops are positioned. During the subsequent operation of the tabulator the stop 27 will coöperate with a column stop to arrest the carriage just after a line on the sheet passes the printing point.

From the foregoing description it will be understood that the column stop controlling member 36—37 is operable individually on the column stops; that said member constitutes a device by which the stops may be individually moved on their support to release the stops from their locking means 18; that said member 36—37 also constitutes a positioning device which is in the nature of latching means coöperative with each column stop to hold it with reference to said device while a relative adjustment in the direction of the travel of the carriage is effected between the stop bar and said stop; that this is true whether the said relative adjustment is effected in one direction or the other of the travel of the carriage, or to the right or to the left; that said device also constitutes means operable individually on the column stops to control the movement thereof into engagement with their locking means and into and out of operative position; that the set of column stops and said controlling device are carried one by the carriage and the other by the frame on which the carriage travels, so that, the travel of the carriage is operative to bring the column stops successively into coöperative relation with said device.

While I have herein shown one practical embodiment of my invention for controlling the column or tabulating stops to effect a relative adjustment between the column stops and the member by which they are supported, it will be understood that the invention is not limited to the construction herein shown, but is applicable to all tabulating mechanism of this general character, embracing a plurality of stops adapted to be longitudinally adjusted on their support, and to be engaged by a co-acting stop device or member which is arranged to be shifted into and out of the path of the adjustable stops.

What I claim as new and desire to secure by Letters Patent, is:—

1. In a tabulator mechanism for typewriting machines, the combination with a plurality of tabulator stops and the supporting member along which they are longitudinally spaced and upon which they are mounted to be adjusted toward and from each other, of a single movably mounted setting or adjusting device adapted to directly engage and separately release and set or adjust the stops along their supporting member.

2. In a tabulator mechanism for typewriting machines, the combination with a plurality of tabulator stops and a supporting member therefor, along which the stops are longitudinally spaced and upon which they are adapted to be adjusted toward and from each other, with means for locking the stops in adjusted positions, of a movably mounted setting device adapted to separately and independently release the locking mechanism of each stop, and hold the stop to permit it to be adjusted by relative movement of the supporting member.

3. In a tabulator mechanism for typewriting machines, the combination with a plurality of tabulator stops and a supporting member therefor along which the stops are adapted to be adjusted, with means for locking the stops in adjusted positions, of a lever operated setting finger adapted to release the locking means and to confine the stops while relative adjustment of the stops and bar is effected.

4. In a tabulator mechanism for typewriting machines, the combination with a plurality of tabulator stops and a supporting bar along which said stops are adapted to be adjusted, said stops having rocking motion on the bar whereby they may be locked to and released from the bar, and means to interlock with the stops to rock them to releasing positions and to retain or confine the stops while being adjusted on said bar.

5. In a tabulator mechanism for typewriting machines, the combination with a member carried by or movable with the carriage and a plurality of stops having means to lock them on said member and adapted to be adjusted longitudinally of the member, of means carried by a relatively fixed part of the machine for separately engaging the stops to release them from said member and to hold the stops while the member is shifted to adjust the stops on said bar.

6. In a tabulator mechanism for typewriting machines, the combination with a member carried by or movable with the carriage and a plurality of stops having means to lock them on said member and adapted to be adjusted longitudinally of the member, of a lever actuated finger pivoted to a relatively fixed part of the frame and adapted to interlock with the stops to release them from the member and to hold them while said member is being longitudinally shifted to thereby adjust the stops on the member.

7. In a tabulator mechanism for typewriting machines, the combination with a member carried by or movable with the carriage and a plurality of stops having means to lock them on said member and adapted to be adjusted longitudinally of the member, of a lever actuated finger pivoted to a relatively fixed part of the frame and adapted to interlock with the stops to release them from the member and to hold them while said member is being longitudinally shifted to thereby adjust the stops on the member, and means arranged to brace or stiffen the finger near its free end.

8. A tabulator stop setting device comprising a lever actuated member having means to separately engage the tabulator stops to release the latter from their supporting member and confine the stops while they are being adjusted on the support, and means for movably supporting the lever actuated member.

9. In a tabulator or stop mechanism for typewriting machines, the combination with a stop device and its supporting member to which the stop device is normally locked, of a single setting device adapted by movement thereof in one direction to interlock with the stop device to hold it stationary and to release the stop device from its supporting member.

10. In a tabulator or stop mechanism for typewriting machines, the combination with a stop device and its supporting member to which the stop device is normally locked, of a pivoted lever arranged when swung in one direction to release the stop device from its supporting member and lock it stationary, and when swung in the other direction to relock the stop device to its supporting member and release said stop device.

11. A typewriting machine embracing an endwise traveling paper carriage and its supporting frame, a bar carried by and arranged longitudinally of the carriage, a series of spaced tabular stops on the bar and adjustable longitudinally therealong with means for locking them in adjusted position, means mounted on said frame to separately and independently release said stops from the bar and to hold them stationary while the carriage is shifted endwise and thereby reset the stops on said bars, and a coöperating stop on the frame.

12. A typewriting machine embracing an endwise traveling carriage and its supporting frame, a bar carried by and arranged longitudinally of the carriage and provided with a series of closely spaced notches, a series of tabulator stops spaced longitudinally of said bar a d slidable endwise thereof, and provided with means to engage the notches of the bar to lock the stops thereto, means carried by said frame arranged to separately release said stops from the notches of said bar and to hold them stationary while the carriage is shifted endwise to thereby reset the stops on the bar and a coöperating stop on the frame.

13. A typewriting machine embracing an endwise traveling carriage and its supporting frame, a bar carried by and arranged longitudinally of the carriage and provided with a series of closely spaced notches, a series of tabulator stops spaced longitudinally of said bar and slidable endwise thereof, and having a rocking or tilting movement thereon to engage the stops with and release them from the notched bar, means carried by the frame for so releasing the stops from said bar and for holding them temporarily fixed during the endwise movement of the carriage and a coöperating stop carried by said frame.

14. A typewriting machine embracing an endwise traveling carriage and its supporting frame, a letter spacing mechanism embracing a rack on the carriage and a pinion and a tabulator mechanism embracing a flange on the rack bar, a series of longitudinally spaced tabulator stops carried by and adjusted longitudinally of said flange, a coöperating stop on the carriage and resetting means embracing a member mounted on the frame to separately engage the tabulator stops and release them from the said flange and to hold them fixed while the carriage is shifted endwise.

15. In a typewriter, an endwise traveling carriage and its supporting frame, a series of tabulator stops carried by and adjustable relatively to each other longitudinally of the carriage, and having means to lock them in adjusted position, a coöperating stop on the frame, a right-hand margin stop on the carriage, a coöperating stop therefor on the frame having a release key, and means operable by movement of the said release key to release the tabulator stops from the carriage and to hold them while the carriage is shifted to thereby adjust the tabulator stops on the carriage.

16. In a typewriting machine and tabulating mechanism, the combination of a column stop, coöperative key actuated tabulator stop mechanism, a stop bar, said column stop and bar having a relative sliding movement one on the other so that the column stop may be adjusted to different points along said bar, and positioning means adapted to co-act with and restrain the column stop relatively to said positioning means while the required relative movement between said bar and column stop is effected, said positioning means being distinct from said key actuated tabulator stop mechanism.

17. In a typewriting machine and tabulating mechanism, the combination of a series of column stops, locking means therefor, each column stop being mounted for relative sliding movement and adjustment along and on that part of the machine which carries it and being mounted also for movement into and out of engagement with said locking means, and a single device operative individually on the column stops to control the movement of said stops into or out of engagement with said locking means.

18. In a typewriting machine and tabulating mechanism, the combination of a series of column stops adjustable to various distances apart, each stop being also angularly and separately movable to and from operative position, and hand controlled means operable individually on said column stops to control such angular movement.

19. In a typewriting machine and tabulating mechanism, the combination of a series of column stops mounted for relative adjustment on that part of the machine which supports them, coöperative key controlled tabulator stop mechanism, and latching means by which each column stop may be restrained against movement relatively to said latching means while a relative adjustment is effected between the stop and the support therefor, said latching means being distinct from said key controlled tabulator stop mechanism.

20. In a typewriting machine and tabulating mechanism, the combination of a series of column stops mounted for sliding movement on their support for purposes of adjustment, coöperative key controlled tabulator stop mechanism, and pivoted positioning means which co-acts with said column stops to restrain them against movement relatively to said positioning means in the direction of the travel of the carriage, whether the carriage travels in one direction or the other.

Signed at Cicero, county of Cook and State of Illinois, this 20 day of May, 1912.

WALTER E. PALMER.

Witnesses:
G. E. Dowle,
William L. Hall.